United States Patent
Yang

(10) Patent No.: US 10,837,773 B2
(45) Date of Patent: Nov. 17, 2020

(54) DETECTION OF VERTICAL STRUCTURES BASED ON LIDAR SCANNER DATA FOR HIGH-DEFINITION MAPS FOR AUTONOMOUS VEHICLES

(71) Applicant: DeepMap Inc., Palo Alto, CA (US)

(72) Inventor: Lin Yang, San Carlos, CA (US)

(73) Assignee: DEEPMAP INC., Palo Alto, CA (US)

( * ) Notice: Subject to any disclaimer, the term of this patent is extended or adjusted under 35 U.S.C. 154(b) by 477 days.

(21) Appl. No.: 15/855,557

(22) Filed: Dec. 27, 2017

(65) Prior Publication Data
US 2018/0188038 A1    Jul. 5, 2018

Related U.S. Application Data

(60) Provisional application No. 62/441,080, filed on Dec. 30, 2016.

(51) Int. Cl.
*G01C 21/32* (2006.01)
*G01S 17/89* (2020.01)
(Continued)

(52) U.S. Cl.
CPC ............ *G01C 11/12* (2013.01); *B60W 40/06* (2013.01); *G01C 11/06* (2013.01); *G01C 11/30* (2013.01);
(Continued)

(58) Field of Classification Search
CPC ......... G01C 11/12; G01C 11/30; G01C 11/06; G01C 21/3602; G01C 21/32; G01C 21/3694; G01C 21/3635; G01C 21/005; G05D 1/0088; G05D 1/0246; G05D 2201/0213; G06T 7/74; G06T 7/68;
(Continued)

(56) References Cited

U.S. PATENT DOCUMENTS 7,046,841 B1 * 5/2006 Dow ...................... G01C 11/00
                                                            345/419
7,804,498 B1    9/2010 Graham et al.
(Continued)

OTHER PUBLICATIONS

PCT International Search Report and Written Opinion, PCT Application No. PCT/US2017/068595, dated May 7, 2018, 19 pages.
(Continued)

*Primary Examiner* — Daniel L Murphy
(74) *Attorney, Agent, or Firm* — Maschoff Brennan

(57) ABSTRACT

A vehicle computing system performs enhances relatively sparse data collected by a LiDAR sensor by increasing the density of points in certain portions of the scan. For instance, the system generates 3D triangles based on a point cloud collected by the LiDAR sensor and filters the 3D triangles to identify a subset of 3D triangles that are proximate to the ground. The system interpolates points within the subset of 3D triangles to identify additional points on the ground. As another example, the system uses data collected by the LiDAR sensor to identify vertical structures and interpolate additional points on those vertical structures. The enhanced data can be used for a variety of applications related to autonomous vehicle navigation and HD map generation, such as detecting lane markings on the road in front of the vehicle or determining a change in the vehicle's position and orientation.

18 Claims, 18 Drawing Sheets

(51) Int. Cl.

| | | |
|---|---|---|
| G01C 11/12 | (2006.01) | |
| G06T 7/73 | (2017.01) | |
| G06T 7/68 | (2017.01) | |
| G06K 9/00 | (2006.01) | |
| G06T 7/55 | (2017.01) | |
| G06T 17/05 | (2011.01) | |
| G01C 11/30 | (2006.01) | |
| G06T 7/246 | (2017.01) | |
| G06K 9/46 | (2006.01) | |
| G01C 11/06 | (2006.01) | |
| G01C 21/36 | (2006.01) | |
| G06T 7/11 | (2017.01) | |
| G05D 1/00 | (2006.01) | |
| G05D 1/02 | (2020.01) | |
| G06T 7/70 | (2017.01) | |
| G06T 7/593 | (2017.01) | |
| G06K 9/62 | (2006.01) | |
| B60W 40/06 | (2012.01) | |
| G01S 19/42 | (2010.01) | |
| G08G 1/00 | (2006.01) | |
| G06T 17/20 | (2006.01) | |
| G01C 21/00 | (2006.01) | |
| G01S 19/47 | (2010.01) | |
| G01S 19/46 | (2010.01) | |

(52) U.S. Cl.
CPC .......... *G01C 21/005* (2013.01); *G01C 21/32* (2013.01); *G01C 21/3602* (2013.01); *G01C 21/3635* (2013.01); *G01C 21/3694* (2013.01); *G01S 19/42* (2013.01); *G05D 1/0088* (2013.01); *G05D 1/0246* (2013.01); *G06K 9/00791* (2013.01); *G06K 9/00798* (2013.01); *G06K 9/00805* (2013.01); *G06K 9/4671* (2013.01); *G06K 9/6212* (2013.01); *G06T 7/11* (2017.01); *G06T 7/246* (2017.01); *G06T 7/248* (2017.01); *G06T 7/55* (2017.01); *G06T 7/593* (2017.01); *G06T 7/68* (2017.01); *G06T 7/70* (2017.01); *G06T 7/73* (2017.01); *G06T 7/74* (2017.01); *G06T 17/05* (2013.01); *G06T 17/20* (2013.01); *G08G 1/20* (2013.01); *B60W 2552/00* (2020.02); *G01S 17/89* (2013.01); *G01S 19/46* (2013.01); *G01S 19/47* (2013.01); *G05D 2201/0213* (2013.01); *G06T 2200/04* (2013.01); *G06T 2207/10021* (2013.01); *G06T 2207/10028* (2013.01); *G06T 2207/20048* (2013.01); *G06T 2207/30252* (2013.01); *G06T 2207/30256* (2013.01); *G06T 2210/56* (2013.01); *G06T 2215/12* (2013.01)

(58) Field of Classification Search
CPC .......... G06T 7/55; G06T 17/05; G06T 7/248; G06T 7/11; G06T 7/70; G06T 7/246; G06T 7/73; G06T 7/593; G06T 17/20; G06T 2207/30256; G06T 2207/20048; G06T 2207/10028; G06T 2207/10021; G06T 2207/30252; G06T 2200/04; G06T 2210/56; G06T 2215/12; G06K 9/00798; G06K 9/4671; G06K 9/00791; G06K 9/6212; G06K 9/00805; B60W 40/06; B60W 2552/00; G01S 19/42; G01S 19/47; G01S 19/46; G01S 17/89; G08G 1/20
USPC ........................................ 356/4.01
See application file for complete search history.

(56) References Cited

U.S. PATENT DOCUMENTS

| | | | |
|---|---|---|---|
| 7,969,558 B2* | 6/2011 | Hall | G01S 7/4811 |
| | | | 356/5.01 |
| 8,521,418 B2* | 8/2013 | Ma | G01S 17/89 |
| | | | 340/435 |
| 9,495,764 B1 | 11/2016 | Boardman et al. | |
| 10,215,583 B2* | 2/2019 | Ng-Thow-Hing | H04N 7/188 |
| 2010/0020306 A1 | 1/2010 | Hall | |
| 2013/0202197 A1 | 8/2013 | Reeler et al. | |
| 2013/0286193 A1 | 10/2013 | Pflug | |
| 2013/0321393 A1 | 12/2013 | Winder | |
| 2015/0170526 A1 | 6/2015 | Wang et al. | |

OTHER PUBLICATIONS

PCT Invitation to Pay Additional Fees and, Where Applicable, Protest Fee, PCT Application No. PCT/US2017/068595, dated Mar. 12, 2018, 2 pages.
United States Office Action, U.S. Appl. No. 15/855,547, filed Feb. 8, 2019, 7 pages.

* cited by examiner

DETECTION OF VERTICAL STRUCTURES BASED ON LIDAR SCANNER DATA FOR HIGH-DEFINITION MAPS FOR AUTONOMOUS VEHICLES

CROSS-REFERENCE TO RELATED APPLICATION

This application claims the benefit of U.S. Provisional Application No. 62/441,080, filed Dec. 30, 2016, which is hereby incorporated by reference in its entirety.

BACKGROUND

This disclosure relates generally to maps for autonomous vehicles, and more particularly to providing high definition maps with high precision and up-to-date map data to autonomous vehicles for safe navigation.

Autonomous vehicles, also known as self-driving cars, driverless cars, auto, or robotic cars, drive from a source location to a destination location without requiring a human driver to control and navigate the vehicle. Automation of driving is difficult for several reasons. For example, autonomous vehicles use sensors to make driving decisions on the fly, but vehicle sensors cannot observe everything all the time. Vehicle sensors can be obscured by corners, rolling hills, and other vehicles. Vehicle sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However, conventional maps have several drawbacks that make them difficult to use for an autonomous vehicle. For example, maps do not provide the level of accuracy required for safe navigation (e.g., 10 cm or less). GPS systems provide accuracies within approximately 3-5 meters, but under certain conditions they can have larger errors that result in an accuracy within over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis of roughly 5-10% per year. But survey cars are expensive and limited in number, so they often cannot be deployed in sufficient numbers to capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

Embodiments of the invention maintain high definition (HD) maps that may be used by autonomous vehicles to safely navigate to their destinations without human input or with limited human input. An autonomous vehicle is a vehicle capable of sensing its environment and navigating without human input. One of the sensors that can be included on a self-driving vehicle is a light detection and ranging (LiDAR) sensor that surveys the surroundings of the vehicle. The LiDAR sensor performs a scan to collect scanner data that comprises a plurality of scan points. Each scan point specifies the range to a surface that was imaged by the LiDAR sensor when emitting a laser pulse in a particular direction.

One drawback to some LiDAR sensors is that the scanner data collected by the LiDAR sensor can be relatively sparse and low-resolution. For example, the LiDAR sensor may collect scan points that are spaced 0.2 degrees apart along each scan line, with successive scan lines spaced 1 degree apart or more. Having scanner data at these relatively low resolutions makes it difficult to use the scanner data for certain tasks associated with generating HD maps and more generally with navigating an autonomous vehicle. For instance, the scanner data may not include enough scan points on the road surface to detect important information (such as lane markings) on the road in front of the vehicle, and the scanner data may not be dense enough to perform sufficiently reliable detection of vertical structures (such as telephone poles and mailboxes).

Embodiments relate to processes that enhance the relatively sparse and low-resolution data collected by a LiDAR sensor by increasing the density of points in certain portions of the scan. The enhanced data can then be used for a variety of applications related to autonomous vehicle navigation and HD map generation.

One of the processes enriches point cloud data on the ground in front of the vehicle. A computing system obtains a point cloud that represents scan points collected by the LiDAR sensor while performing a scan. The computing system generates a plurality of three-dimensional triangles using the 3D points in the point cloud as vertices. The 3D triangles are filtered to identify a subset of 3D triangles that are substantially flat on the ground. A 3D triangle is substantially flat on the ground if all three vertices of the 3D triangle are proximate to the ground surface. The computing system can then generate a plurality of additional 3D points on the ground by interpolating 3D points within the subset of 3D triangles.

The interpolated 3D points can be used for a variety of tasks related to the road surface in front of the vehicle. In one embodiment, the vehicle also includes a camera that captures an image of the area in front of the vehicle. The colors in the image can then be used to assign a color to each of the interpolated 3D points so that the 3D points specify the color at their respective positions on the road surface. The colors assigned to the 3D points can then be used to generate a map of the lane marking in front of the vehicle, which can be used for navigation purposes (e.g., controlling the autonomous vehicle to keep it in the same lane) or to improve HD map data.

Another process enriches point cloud data on vertical structures. The computing system receives scanner data collected by the LiDAR sensor and generates vertical elements by connecting scan points having the same position along adjacent scan lines. The vertical elements are filtered to identify a subset of vertical elements that correspond to vertical structures. For example, the vehicle computing system may remove vertical elements if the direction of the line segment between the two scan points deviates from the vertical direction by more than a threshold angle. The vertical elements in the subset are clustered to generate one or more vertical clusters that each represent a vertical structure within the detection range of the LiDAR sensor, such as tree trunks, utility poles, buildings, or mailboxes. The system may also perform interpolation within each vertical cluster to generate additional points representing the surface of the corresponding vertical structure.

The vertical clusters can be used for various tasks related to navigating the vehicle or improving HD map data. For example, because vertical structures along the side of the road are usually stationary, the vehicle computing system can determine the position of a vertical structure relative to the vehicle (based on the position of the vertical elements in the corresponding vertical cluster) at two successive points in time (e.g., two successive LiDAR scans), and determine a change in position and direction the vehicle is moving by comparing the two positions.

Figure 1:
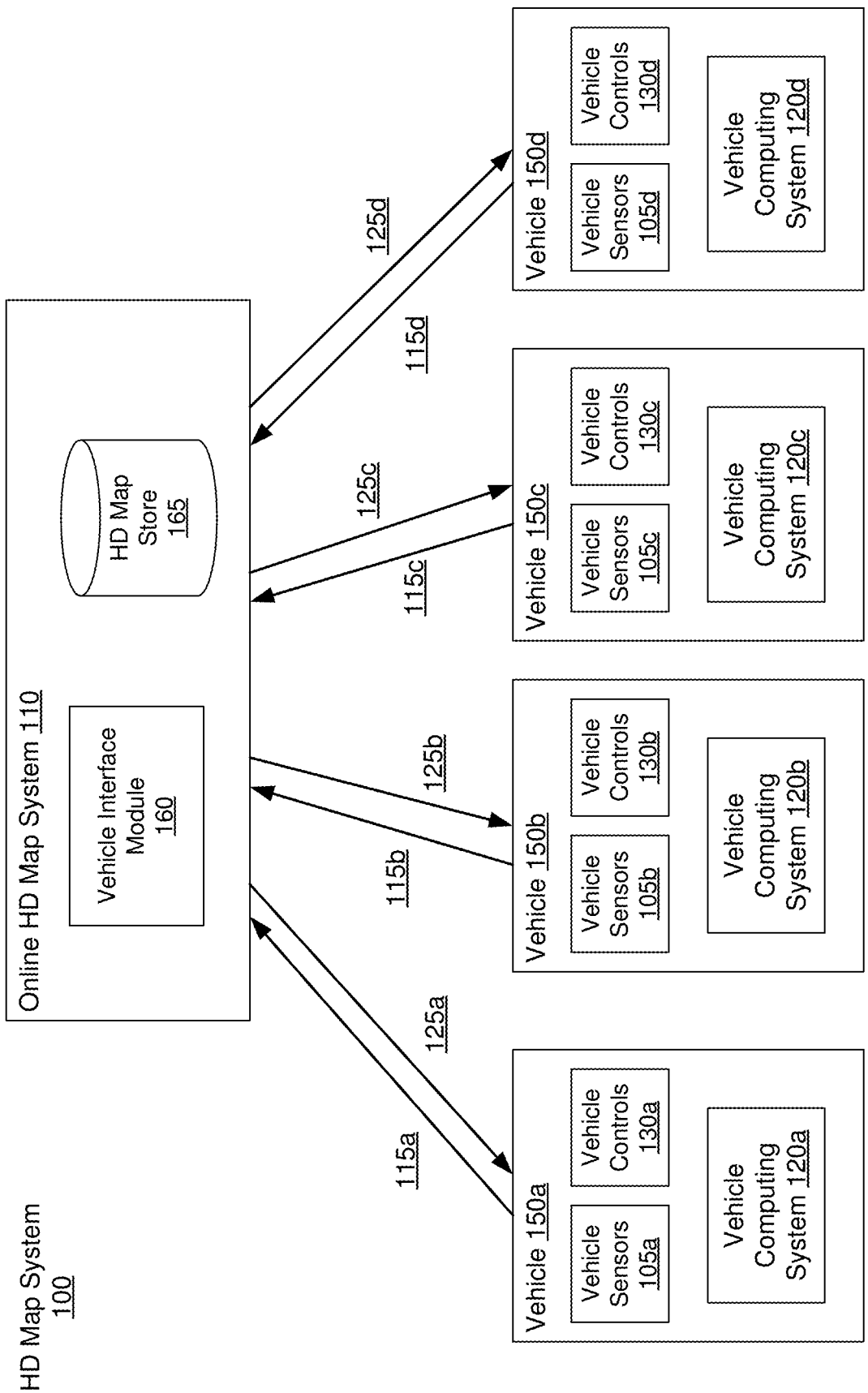
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
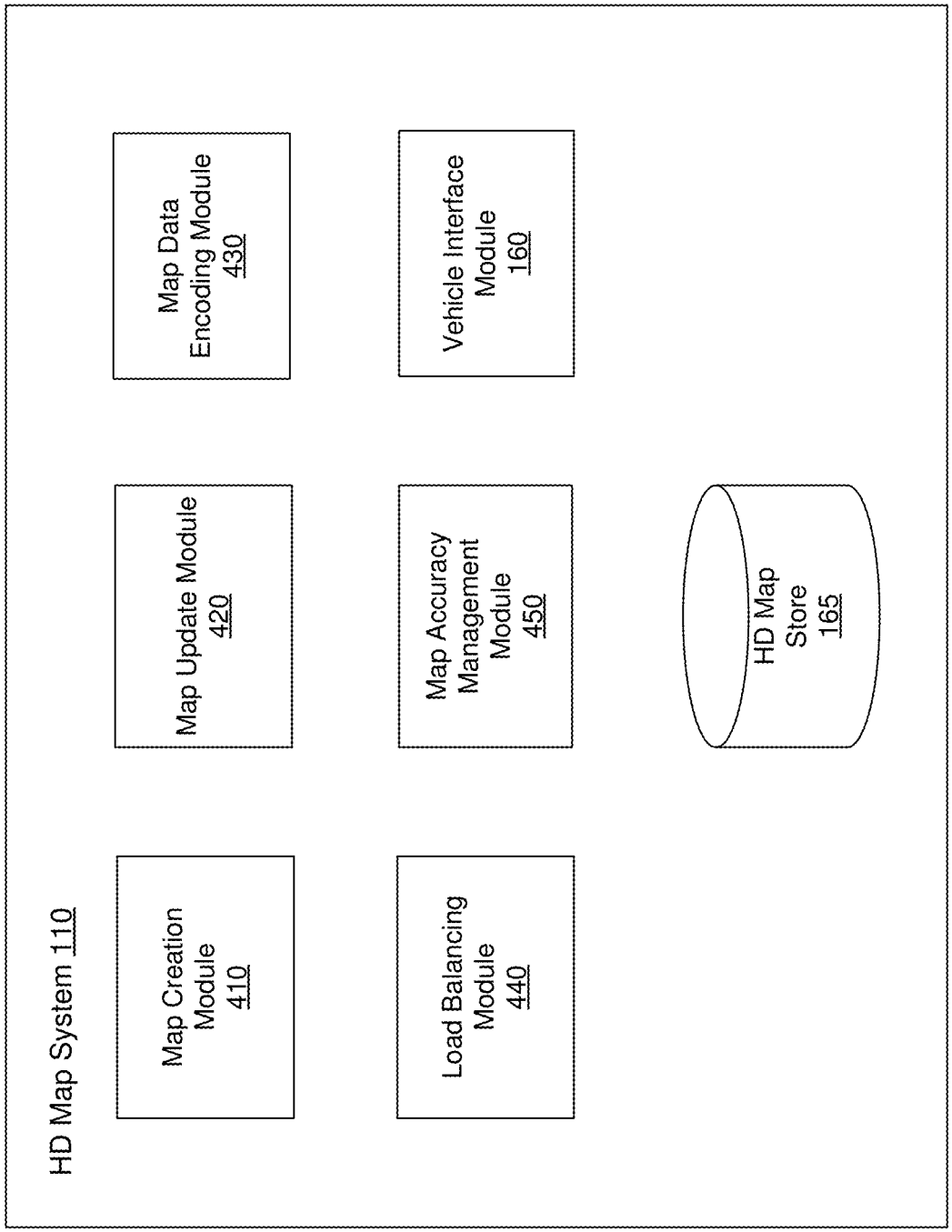
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have a certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise one or more cameras, a light detection and ranging (LiDAR) sensor, a global positioning system (GPS) navigation system, an inertial measurement unit (IMU), and others. The cameras capture images of the surroundings of the vehicle. The LiDAR sensor surveys the surroundings of the vehicle by measuring distance to a target by illuminating that target with laser light pulses, and measuring the reflected pulses. The GPS navigation system determines the position of the vehicle based on signals from satellites. The IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
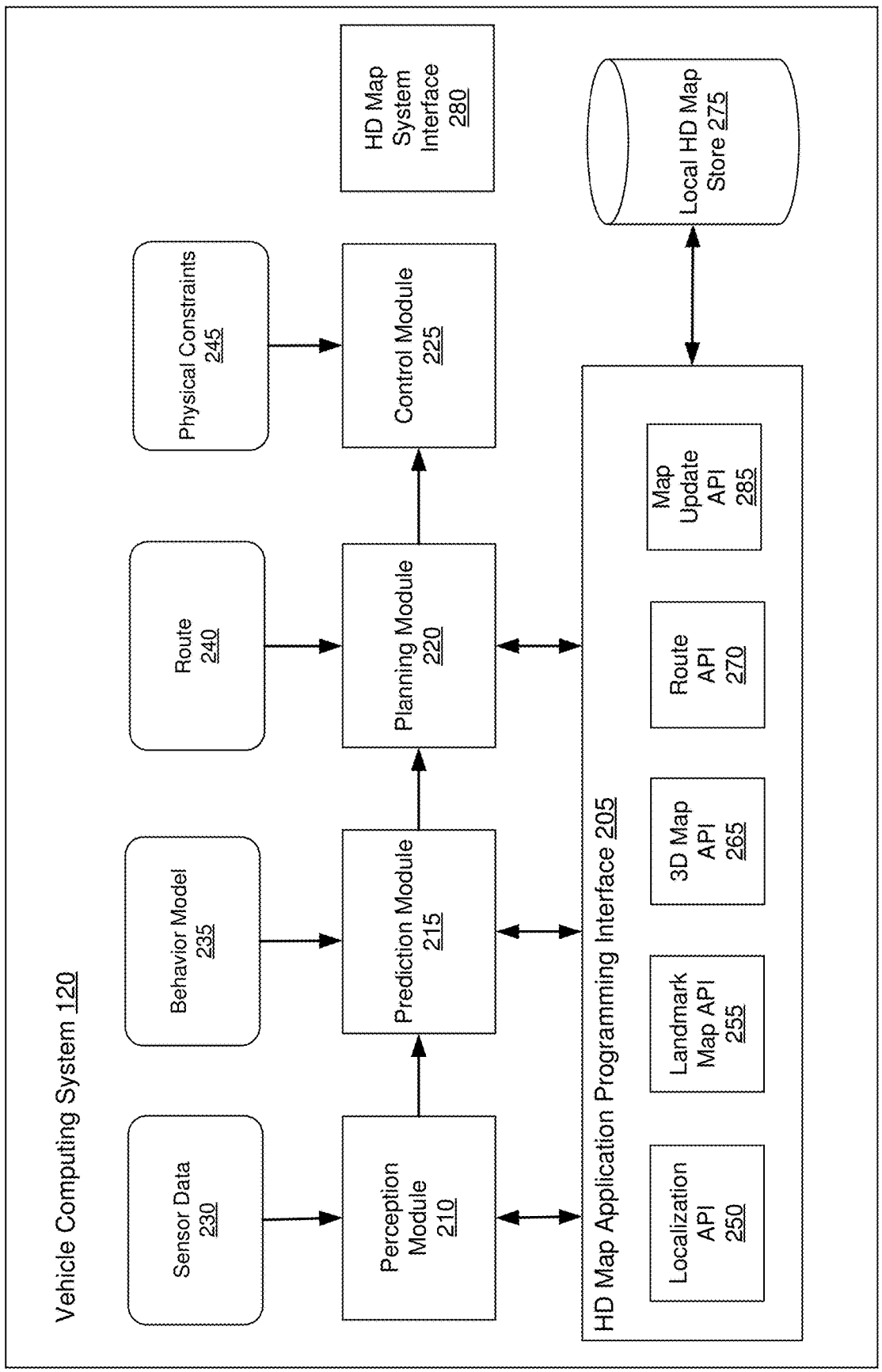
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various types of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LiDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 220 receives the information describing the surroundings of the vehicle from the prediction module 215, the route 240 that determines the destination of the vehicle, and the path that the vehicle should take to get to the destination. The planning module 220 uses the information from the prediction module 215 and the route 240 to plan a sequence of actions that the vehicle needs to take within a short time interval, for example, within the next few seconds. In an embodiment, the planning module 220 specifies the sequence of actions as one or more points representing nearby locations that the vehicle needs to drive through next. The planning module 220 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 220. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

Figure 3:
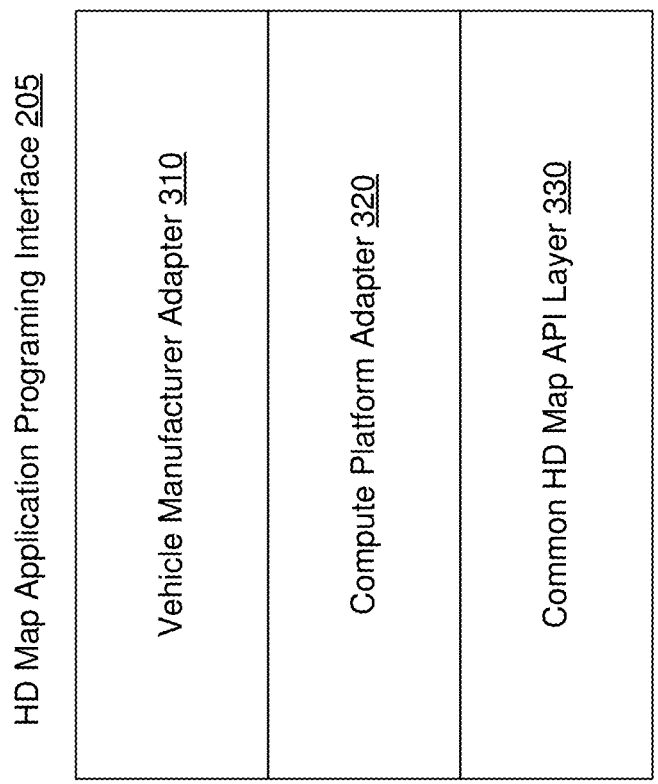
FIG. 3 illustrates the various layers of instructions in the HD Map API of a vehicle computing system, according to an embodiment.

FIG. 3 illustrates the various layers of instructions in the HD Map API of a vehicle computing system, according to an embodiment. Different manufacturers of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platforms for autonomous vehicles include platforms provided by vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

As shown in FIG. 3, in an embodiment, the HD map API is implemented as a library that includes a vehicle manufacturer adapter 310, a compute platform adapter 320, and a common HD map API layer 330. The common HD map API layer 330 comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system 110, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
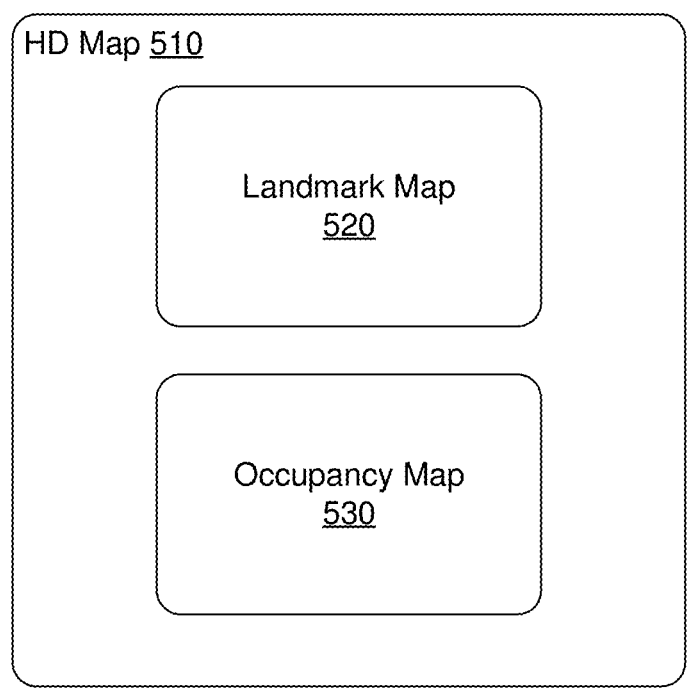
FIG. 5 illustrates the components of an HD map, according to an embodiment.

FIG. 5 illustrates the components of an HD map 510, according to an embodiment. The HD map 510 comprises maps of several geographical regions. The HD map 510 of a geographical region comprises a landmark map (LMap) 520 and an occupancy map (OMap) 530. The landmark map 520 comprises information describing lanes including spatial location of lanes and semantic information about each lane. The spatial location of a lane comprises the geometric location in latitude, longitude and elevation at high precision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map 520 may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map 510 include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (a collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map 510 does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing a sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
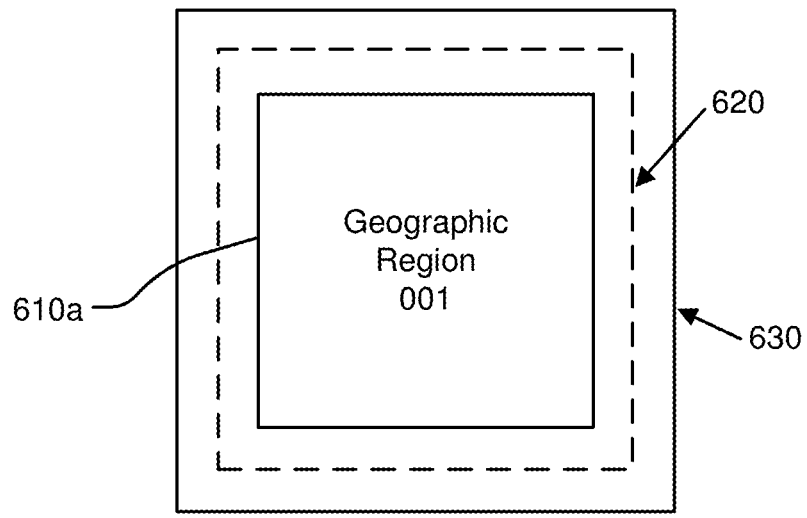
FIGS. 6A-B illustrate geographical regions defined in an HD map, according to an embodiment.
Figure 6B:
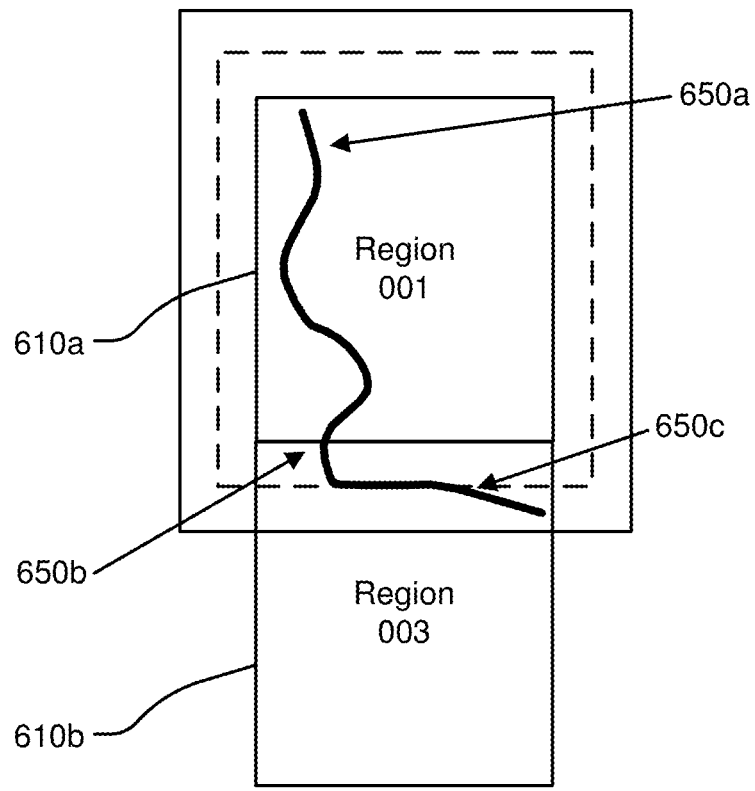

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIGS. 6A and 6B, each geographic region has a buffer of a predetermined width around it. The buffer comprises redundant map data around all four sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it crosses the boundary of the geographical region 610a but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
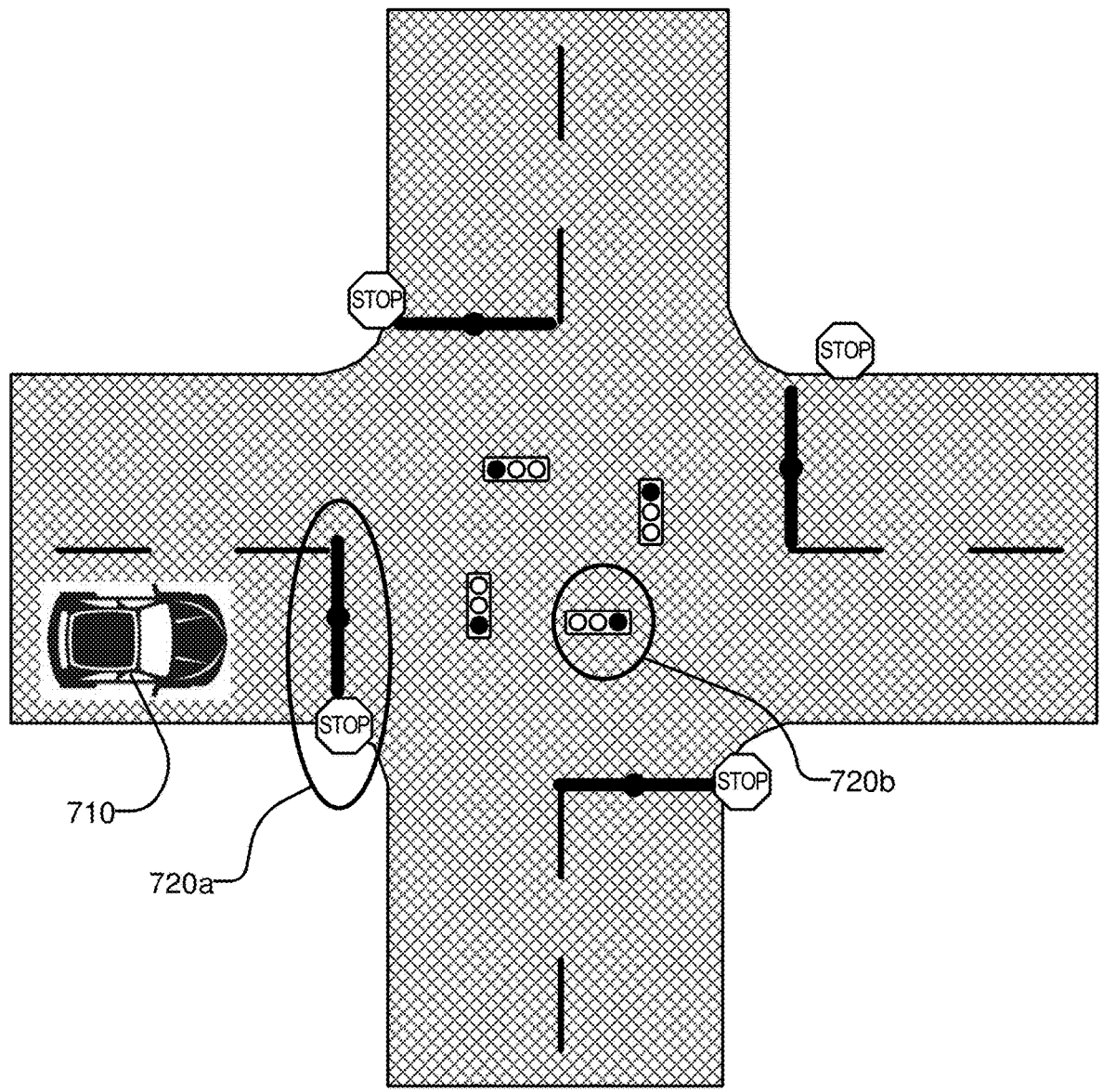
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
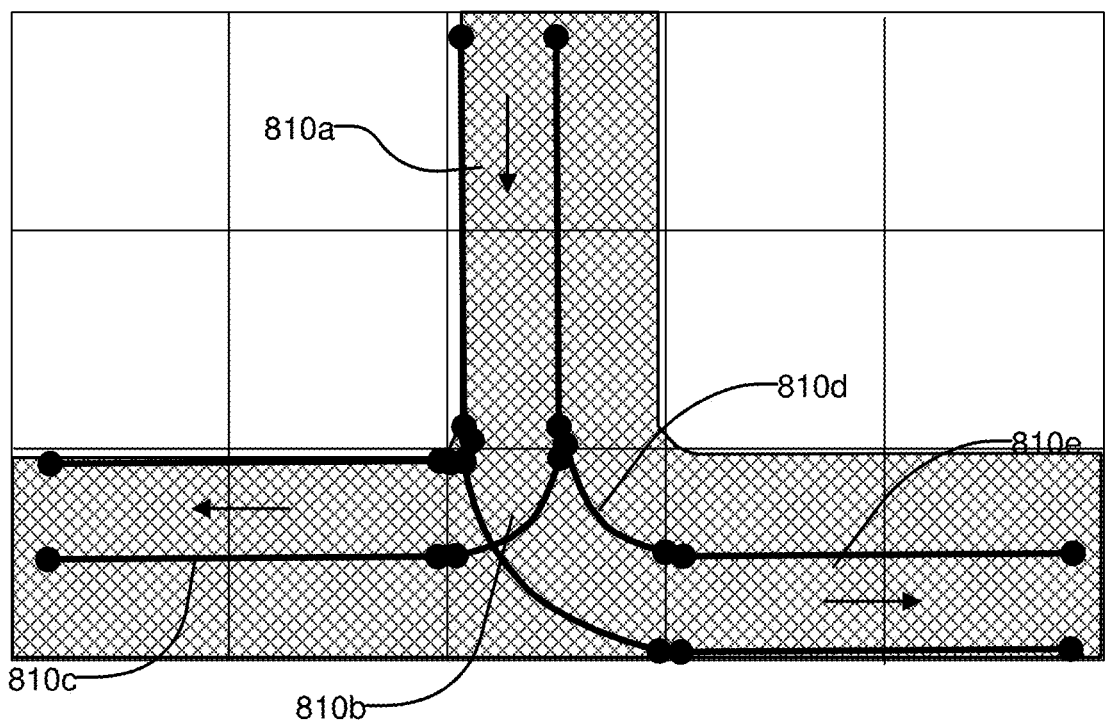
FIGS. 8A-B illustrates lane elements and relations between lane elements in an HD map, according to an embodiment.
Figure 8B:
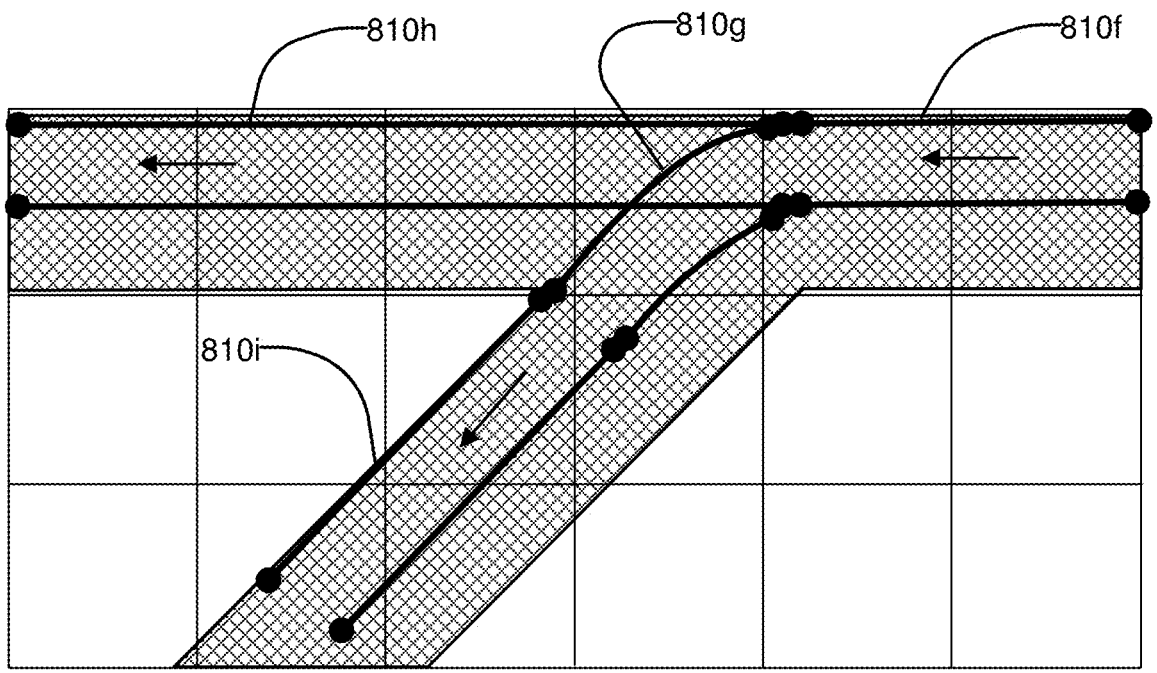

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Point Cloud Enrichment

Figure 9:
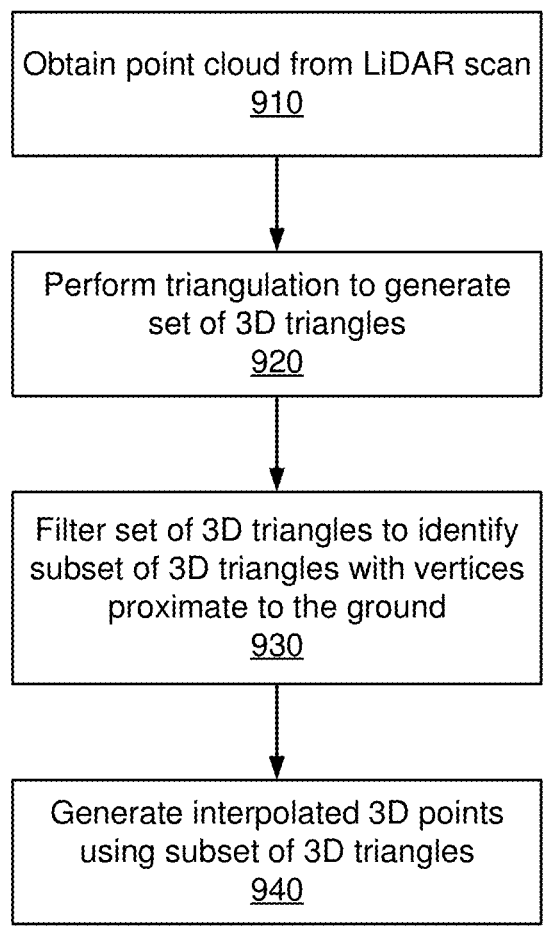
FIG. 9 is a flow chart illustrating a process for enriching a point cloud obtained from a LiDAR scan, according to an embodiment.

FIG. 9 is a flow chart illustrating a process 900 for enriching a point cloud obtained from a LiDAR scan, according to an embodiment. In one embodiment, the process 900 is performed by the perception module 210 of the vehicle computing system 120. In other embodiments, some or all of the steps in the process 900 may be performed by a different module of the vehicle computing system 120 or by a different device in the HD map system. Furthermore, in various other embodiments, the process 900 may include additional, fewer, or different steps, and the steps shown in FIG. 9 may be performed in a different order.

The process begins when the vehicle computing system 120 obtains 910 a point cloud from a LiDAR scan. As noted above, the vehicle sensors 105 include a light detection and ranging (LiDAR) sensor that surveys the surroundings of the vehicle 150 by measuring distance to a target. The LiDAR sensor measures the distance to targets surrounding the vehicle by illuminating targets with laser light pulses and measuring the reflected pulses. In some embodiments, the LiDAR sensor includes a laser and a rotating mirror, and the LiDAR sensor performs a scan by operating the rotating mirror to cause the laser pulses to be emitted from different pitch and yaw angles.

In one embodiment, the LiDAR sensor performs the scan by collecting multiple scan points at varying positions along multiple scan lines. Each scan line is captured by emitting a plurality of laser pulses at the same pitch angle. To collect the scan points along a scan line, the LiDAR sensor rotates the mirror horizontally along the scan line (i.e., varying the yaw angle without varying the pitch angle) and emits and measures laser pulses at regular intervals as the mirror rotates. After collecting the scan points along one scan line, the LiDAR sensor collects scan points along another scan line in the same manner. In one embodiment, the LiDAR sensor collects scan points at every 0.2 degrees of yaw along each scan line, and the scan lines are spaced 1 degree of pitch apart from each other. In other embodiments, the LiDAR sensor may be configured to collect scan points at different pitch and/or yaw intervals.

The data collected during a LiDAR scan is referred to herein as scanner data. Scanner data includes the plurality of scan points that were collected during the LiDAR scan. The scan points can be organized into their respective scan lines, and the scan points in each scan line may be assigned an index value representing the position (i.e., the yaw angle) of the scan point along the scan line. Each scan point specifies the distance that the LiDAR sensor detected when measuring the laser pulse that was emitted to collect the scan point. The distance specified by each scan point represents the range to the surface that was imaged by the corresponding laser pulse. If no surface was detected for a laser pulse (e.g., if the laser pulse did not strike a surface detectable by the LiDAR sensor), then a null value may be stored for the corresponding scan point.

As referred to herein, the point cloud is a set of points in three-dimensional space that represent the positions of scan points in the scanner data. The 3D points in the point cloud may be generated by converting the range values and associated pitch and yaw angles collected by the LiDAR sensor into a three-dimensional coordinate system, such as Cartesian coordinates, cylindrical coordinates, or spherical coordinates.

In one embodiment, the point cloud includes every scan point in the scanner data. In another embodiment, the vehicle computing system 120 may generate the point cloud by subsampling the scanner data. For instance, the vehicle computing system 120 may perform subsampling along each scan line (e.g., sampling every fourth or fifth scan point along each scan line and discarding the remaining scan points). Subsampling along scan lines in this manner may be advantageous because the scanner data collected by some LiDAR sensors include scan points that are spaced relatively close together along a scan line (e.g., a difference of 0.2 degrees in yaw angle between two adjacent scan points), but scan lines that are spaced relatively far apart (e.g., a difference of 1.0 degrees in pitch angle between two adjacent scan lines). Subsampling along a scan line results in a point cloud in which scan points have approximately the same angular spacing along both the pitch and yaw angles, which can improve the quality of the triangles generated during the triangulation step 920.

At the same time the LiDAR scan is performed, a camera on the vehicle (another one of the vehicle sensors 105) can capture an image of an area near the vehicle. For example, the vehicle sensors 105 include a front-facing camera that captures the area in front of the vehicle. As a result, the field of view of the camera overlaps at least in part with the field of view of the LiDAR sensor. As noted in further detail below, the image can later be used to apply a color to the points that are generated in the interpolation step 940.

The vehicle computing system 120 performs 920 triangulation to generate a set of 3D triangles based on the 3D points in the point cloud. In one embodiment, the vehicle computing system 120 performs 920 triangulation through a triangulation process in which the system 120 projects the 3D points in the point cloud onto a two-dimensional plane, performs a two-dimensional clustering algorithm, and then projects the resulting triangles back into three-dimensional space. An example of this process is illustrated in FIGS. 10A-10D.

Figure 10A:
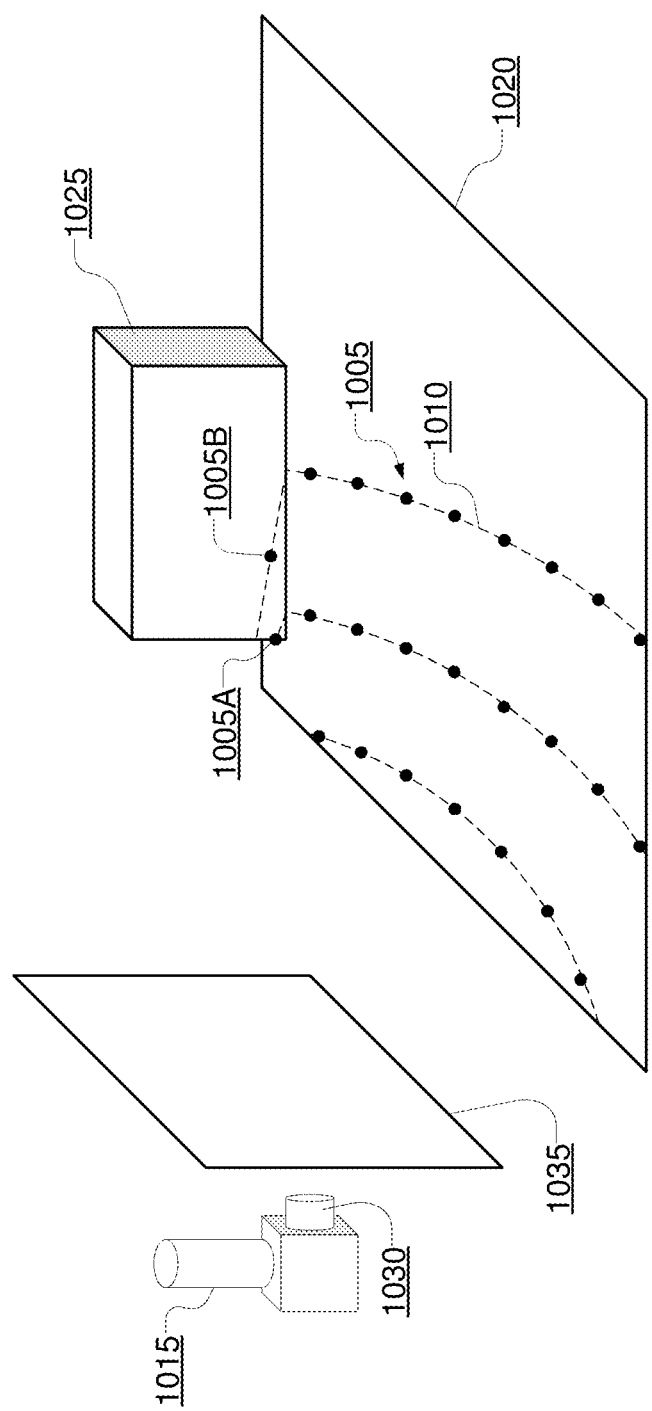
FIGS. 10A-10D illustrate an example of a process for generating a set of 3D triangles based on the 3D points in a point cloud, according to an embodiment.

Referring first to FIG. 10A, illustrated is an example of a point cloud. The point cloud includes a plurality of 3D points 1005 arranged in their respective scan lines 1010. The 3D points 1005 shown in FIG. 10A represent scanner data that was captured by a vehicle-mounted LiDAR sensor 1015 (for the sake of clarity, the vehicle itself is not shown in FIG. 10A). In the example shown in FIG. 10A, the vehicle is traveling forward on a road surface 1020. The rectangular object 1025 represents an object on the road surface, such as a box truck that is driving in front and to the left of the vehicle. Most of the 3D points 1005 are on the road surface 1020, but two of the 3D points 1005A, 1005B are on the rectangular object 1025.

For ease of illustration, FIG. 10A only shows 3D points 1005 in front of the vehicle. In some implementations, the LiDAR sensor performs a scan that encompasses a 360-degree view around the vehicle, and the point cloud also includes 3D points on other sides of the vehicle, such as the sides and back of the vehicle. Furthermore, FIG. 10A only shows a relatively small number of 3D points 1005 for ease of illustration. In some implementations, the point cloud includes many more 3D points 1005 than shown in the example illustrated in FIG. 10A. For instance, the point cloud may include tens of thousands or hundreds of thousands of 3D points.

The triangulation process begins by projecting the 3D points in the point cloud onto a two-dimensional plane to generate a plurality of two-dimensional points. In an embodiment where the vehicle includes a camera, the 3D points may be projected onto a 2D plane that is parallel to the image sensor of the camera 1030. For example, in FIG. 10A, the 2D points 1005 may be projected onto the plane 1035, which is parallel to the sensor of a camera 1030 that is mounted on the vehicle. The 3D points may alternatively be projected onto a different plane, such as a plane that is parallel to the road surface 1020.

Figure 10B:
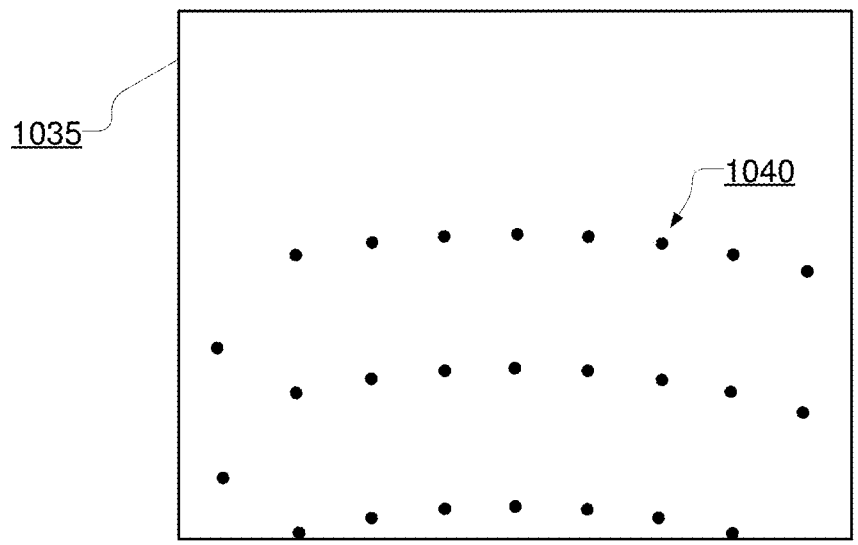

Referring next to FIG. 10B, illustrated is an example of the 2D points 1040 that are generated by projecting the 3D points 1010 shown in FIG. 10A onto the 2D plane 1035. As noted above, the point cloud may include additional points (e.g., at the sides or back of the vehicle) that are not shown in FIG. 10A. Similarly, the projection may yield additional 2D points (e.g., corresponding to 3D points at the sides or back of the vehicle) that are not shown in FIG. 10B.

In an embodiment where the plane is parallel to the sensor of a camera, the vehicle computing system 120 can identify a region of the plane that corresponds to an image region depicted by the image captured by the camera. The system 120 can then discard any 2D points that are projected onto a position on the plane outside of the image region. For example, the region represented by the rectangle 1035 in FIG. 10B corresponds to the image region captured by the camera 1030, and in an embodiment where the projection yielded additional 2D points, the 2D points beyond the rectangle 1035 may be discarded. Discarding points outside of the image region can be advantageous because the remaining steps of the triangulation process and the broader process 900 for enriching the point cloud can be performed with fewer computational resources. Furthermore, for some applications, points outside the field of view of the camera are not used for later analysis (e.g., applying coloring to points based on image data from the camera), so discarding these points does not result in any substantial loss in functionality.

Figure 10C:
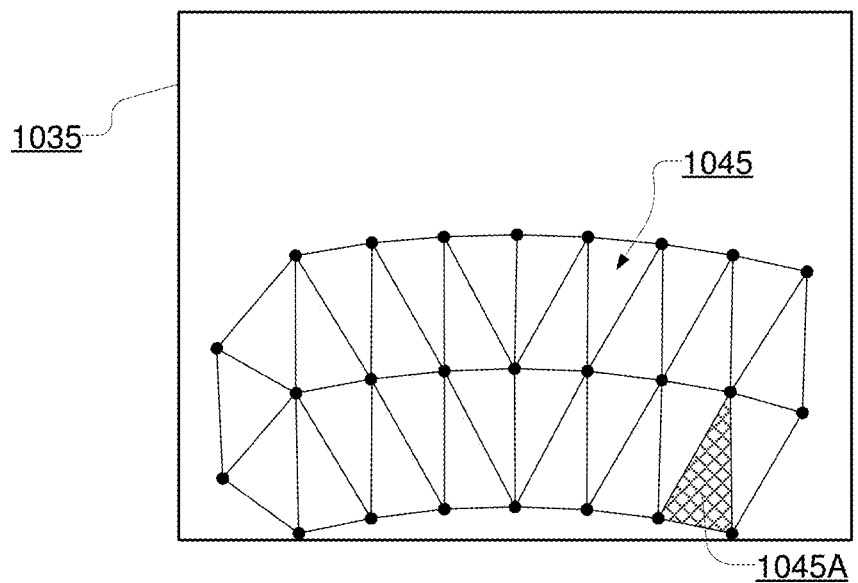

After projecting the 3D points onto the plane to generate the corresponding 2D points, the triangulation process performs a triangulation algorithm on the 2D points to generate a set of 2D triangles. Continuing with the previous example, FIG. 10C illustrates a set of 2D triangles 1045 that is generated by performing triangulation on the 2D points 1040 shown in FIG. 10B. As referred to herein, triangulation is a process for generating a set of two-dimensional triangles whose vertices are defined by a given set of two-dimensional points. In one embodiment, the vehicle computing system 120 performs a Delaunay triangulation on the 2D points, which generates a set of 2D triangles in a manner that maximizes the minimum angle of all the angles in the triangles. In other embodiments, a different type of triangulation algorithm may be used.

The triangulation process generates a set of three-dimensional triangles by mapping the 2D triangles back into three-dimensional space. Each of the 3D triangles corresponds to one of the 2D triangles. More specifically, the vertices of each 3D triangle are defined by the 3D points whose corresponding 2D points formed the vertices of the corresponding 2D triangle.

Figure 10D:
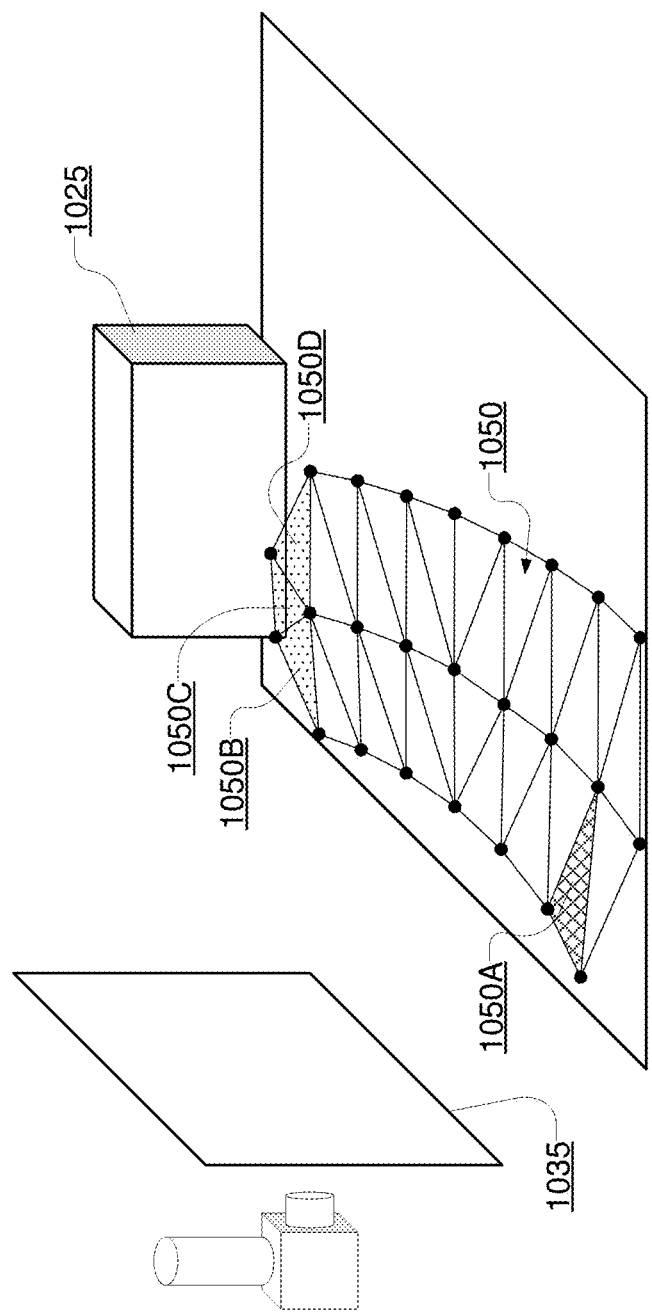

An example of a set of 3D triangles 1050 is shown in FIG. 10D. In the example shown in FIG. 10D, each 3D triangle 1050 corresponds to one of the 2D triangles 1045 shown in FIG. 10C. For example, the 3D triangle 1050A corresponds to the 2D triangle 1045A in FIG. 10C because the vertices of the 3D triangle 1050A, when projected onto the plane 1035, form the vertices of the 2D triangle 1045A.

In some embodiments, multiple cameras are mounted on the vehicle 130. In this case, the vehicle computing system 130 may perform multiple separate projections to generate multiple sets of 2D points. For example, the vehicle computing system 130 identifies multiple planes, with each plane parallel to the image sensor of one of the cameras, and then projects the 3D points in the point cloud onto each of the planes. The vehicle computing system 130 can then perform a triangulation separately on each set of 2D points to generate multiple sets of 2D triangles, and then generate a unified set of 3D triangles by mapping each set of 2D triangles back into three-dimensional space and taking the union of each resulting set of 3D triangles. The remaining steps 930, 940 of the process can then be performed on the unified set of 3D triangles.

Figure 11:
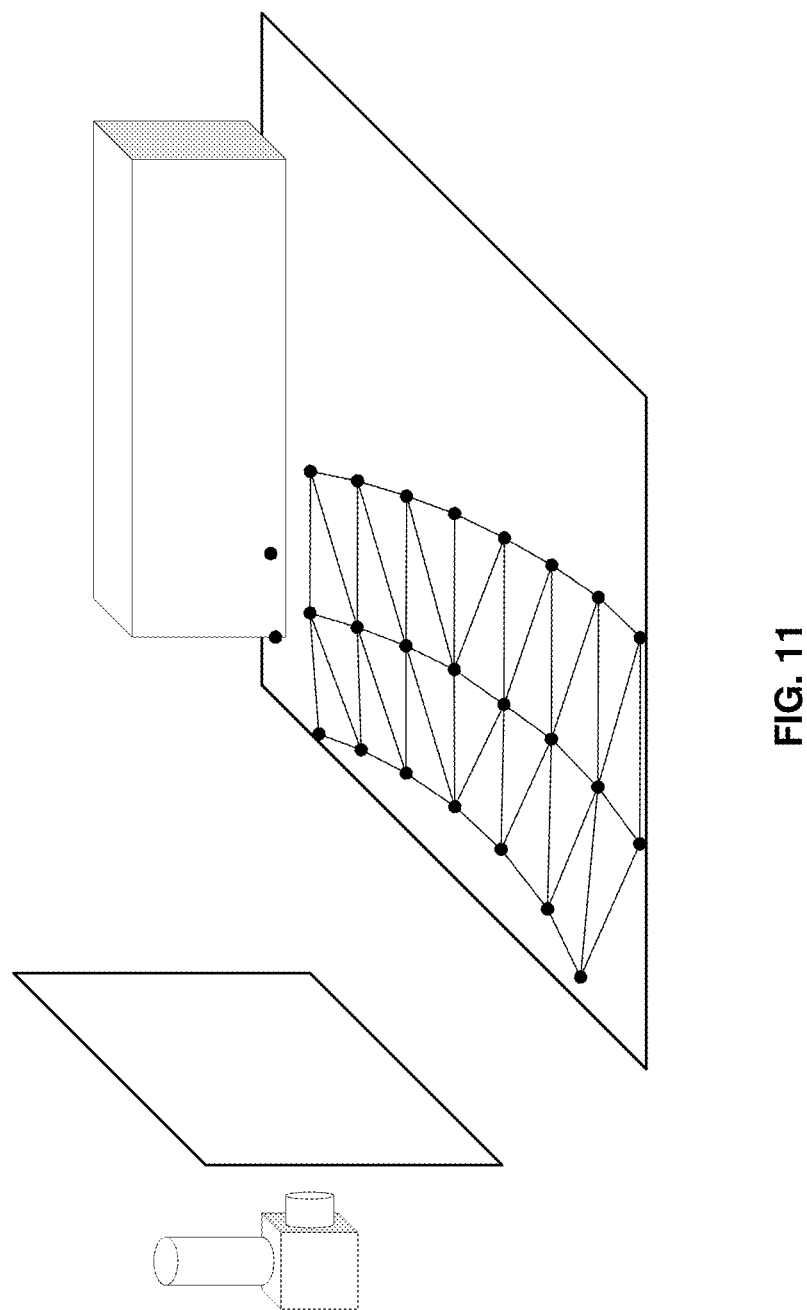
FIG. 11 illustrates an example of the subset of 3D triangles identified by a filtering process, according to an embodiment.

Referring back to FIG. 9, the vehicle computing system 120 filters 930 the set of 3D triangles to identify a subset of 3D triangles whose vertices are proximate to the ground surrounding the LiDAR sensor. A vertex is considered to be proximate to the ground if the vertex is less than a threshold distance away from the ground surface. The threshold distance may be, for example, 10 cm, 20 cm, 50 cm, or some other distance. For instance, in the example shown in FIG. 10D, most of the 3D triangles 1050 have all three vertices on the ground. However, the three triangles 1050B, 1050C, and 1050D all have at least one vertex that is on the surface of the rectangular object 1025. Thus, the filtering step 930 removes these three triangles 1050B, 1050C, and 1050D while the remaining 3D triangles shown in FIG. 10D are identified as being part of the subset of 3D triangles. FIG. 11 illustrates the outcome after the filtering step 930 is performed on the 3D triangles 1050 shown in FIG. 10D. An example process 1200 for filtering 930 the set of 3D triangles is described in detail below with reference to FIG. 12.

After filtering 930 the set of 3D triangles, the vehicle computing system 120 generates 940 interpolated 3D points using the subset of 3D triangles. In one embodiment, the vehicle computing system 120 generates 940 each of the interpolated points by randomly selecting one of the 3D triangles in the subset and then using an interpolation formula to place a 3D point at a random position on the plane defined by the 3D triangle and within the boundaries of the 3D triangle.

When randomly selecting one of the 3D triangles, the vehicle computing system 130 may weight each 3D triangle according to its area. In other words, the chance of randomly selecting any given 3D triangle is the ratio between the area of that 3D triangle and the total area of all of the 3D triangles. Weighting each 3D triangle according to its area results in the generation of interpolated 3D points that are uniformly distributed in three-dimensional space. Alternatively, the vehicle computing system 130 may weight each 3D triangle according to the area of its corresponding 2D triangle, which means the chance of randomly selecting any given 3D triangle is the ratio between the area of the corresponding 2D triangle and the total area of all the 2D triangles. Weighting each 2D triangle according to the area of its corresponding 2D triangle results in the generation of interpolated points that are uniformly distributed in the view of the camera, which may allow for higher accuracy when selecting colors for the interpolated points based on a camera image (described in further detail below).

After the interpolated 3D points are generated, the vehicle computing system 120 can select a color for one or more of the interpolated 3D points using an image captured by the camera. More specifically, the vehicle computing system 120 selects a color that matches the color of one or more pixels in the image at a position corresponding to the interpolated 3D point.

In one embodiment, the vehicle computing system 120 selects the color by identifying a position in the image that depicts the interpolated 3D point. For example, the vehicle computing system 120 projects the interpolated 3D point onto the plane to obtain a 2D point, and then identifies a position in the image corresponding to the 2D point. If the plane is parallel to camera sensor, such as in the example shown in FIGS. 10A-10D, then the coordinates of the 2D point on the plane can be used to identify the corresponding position in the image.

After identifying the corresponding position in the image, the vehicle computing system 130 selects the pixel at that position in the image and applies the color of that pixel to the interpolated 3D point. Alternatively, the vehicle computing system may select multiple pixels at the position in the image (e.g., a block of 2×2 pixels, 3×3 pixels, or 4×4 pixels), compute an average or weighted average of the colors in those pixels, and apply the average color to the interpolated 3D point.

After coloring the interpolated 3D points in this manner, the colored 3D points can be used to identify various markings on the road surface in front of the vehicle. For example, the colored 3D points may be used to identify lane markings, crosswalks, or parking space boundaries. The identified markings can then be stored on the online HD map system 110 as part of an existing HD map or used to generate a new HD map, and the resulting HD maps can then be used for driving by one or more of the vehicles 150. Additionally or alternatively, the identified markings can also be used by a vehicle 150 in real-time for navigation and steering purposes, such as keeping the vehicle in the same lane, switching to an adjacent lane, stopping before a crosswalk, or entering a parking space.

In some embodiments, a large number of interpolated 3D points are generated 940, which can use a large amount of computing power and occupy a large amount of storage space. In these embodiments, the generation step 940 may be performed by the online HD map system 110 rather than locally on the vehicle computing system 120 (which may be implemented as a mobile computing system with relatively constrained computing power and data storage). For example, the vehicle computing system 120 sends the subset of 3D triangles to the online HD map system 110, and the vehicle computing system 120 generates 940 the interpolated 3D points (e.g., as part of the process for creating the occupancy map 530).

Similarly, the process of applying a color to each of the interpolated 3D points (which may also use a large amount of computing power) may also be performed by the online HD map system 110. In this case, the vehicle computing system 120 may also send estimated image coordinates for the vertices of each 3D triangle in the subset (which can be computed, for example, based on the 2D points corresponding to these vertices), which allows the online HD map system 110 to more rapidly identify the position in the image depicting each interpolated 3D point.

Figure 12:
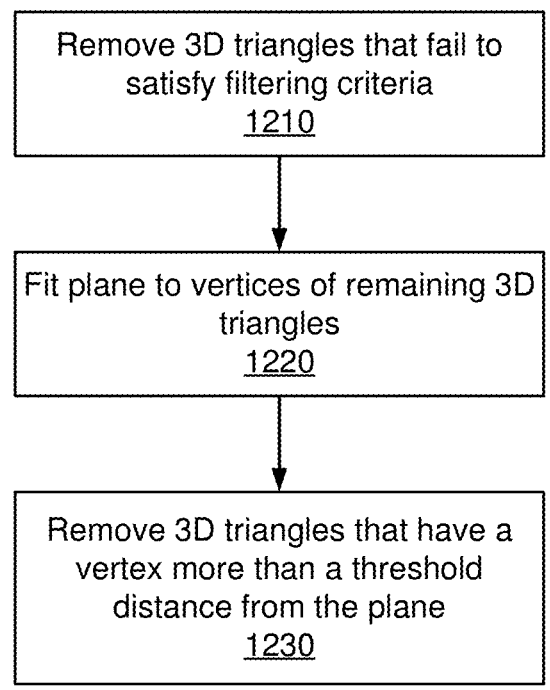
FIG. 12 is a flow chart illustrating a process for filtering 3D triangles to identify a subset of 3D triangles whose vertices are proximate to the ground, according to an embodiment.

FIG. 12 is a flow chart illustrating a process 1200 for filtering 3D triangles to identify a subset of 3D triangles whose vertices are proximate to the ground, according to one embodiment. In other embodiments, the process 1200 may include additional, fewer, or different steps, and the steps shown in FIG. 12 may be performed in a different order.

The vehicle computing system 120 includes one or more predefined filtering criteria for the 3D triangles and removes 1210 any 3D triangles that fail to satisfy one or more of the filtering criteria. For example, one of the filtering criteria may be satisfied when an elevation of a 3D triangle is lower than a threshold elevation, which indicates that the 3D triangle is relatively close to the ground. The elevation of the 3D triangle may be defined, for example, as the z-coordinate of the centroid of the 3D triangle. As a second example, one of the filtering criteria may be satisfied when a normal vector of a 3D triangle (i.e., the normal vector of the plane defined by the vertices of the 3D triangle) differs from the vertical direction by less than a threshold angle, which indicates that the 3D triangle is relatively parallel to the ground.

Other examples of filtering criteria may be directed to removing elongated triangles, which have two vertices spaced close together and a third vertex that is relatively far from the other two vertices. For instance, one of the filtering criteria may be satisfied when a 3D triangle has a longest side shorter than a threshold length, and another one of the filtering criteria may be satisfied when a 3D triangle has an area less than a threshold area. Similar filtering criteria may also be defined based on a 3D triangle's corresponding 2D triangle. For instance, another filtering criteria may be satisfied when a 3D triangle has a corresponding 2D triangle with a longest side shorter than a threshold length, and still another filtering criteria may be satisfied when a 3D triangle has a corresponding 2D triangle with an area less than a threshold area. These filtering rules have the effect of removing 3D triangles that represent a relatively large area (e.g., more than 2 meters across). It may be advantageous to remove such triangles, for example, because they do not contain any data about any objects that may be inside that area, which means a portion of the area within the 3D triangle may not be flat even if the vertices of the 3D triangles are all on a flat surface.

After applying the filtering criteria, the vehicle computing system 120 may additionally fit 1220 a plane to the vertices of the remaining 3D triangles. In one embodiment, the vehicle computing system 120 performs a regression (e.g., a RANSAC regression) to identify a plane of best fit for the vertices of the remaining 3D triangles. This plane is presumed to represent the road surface. After identifying the plane, the vehicle computing system 120 removes 1230 any 3D triangles that have a vertex that is more than a threshold distance from the plane. The 3D triangles that still remain are then presumed to be on flat on the ground, and these 3D triangles are used to generate 940 the interpolated 3D points.

Detection of Vertical Structures Based on Scanner Data

Figure 13:
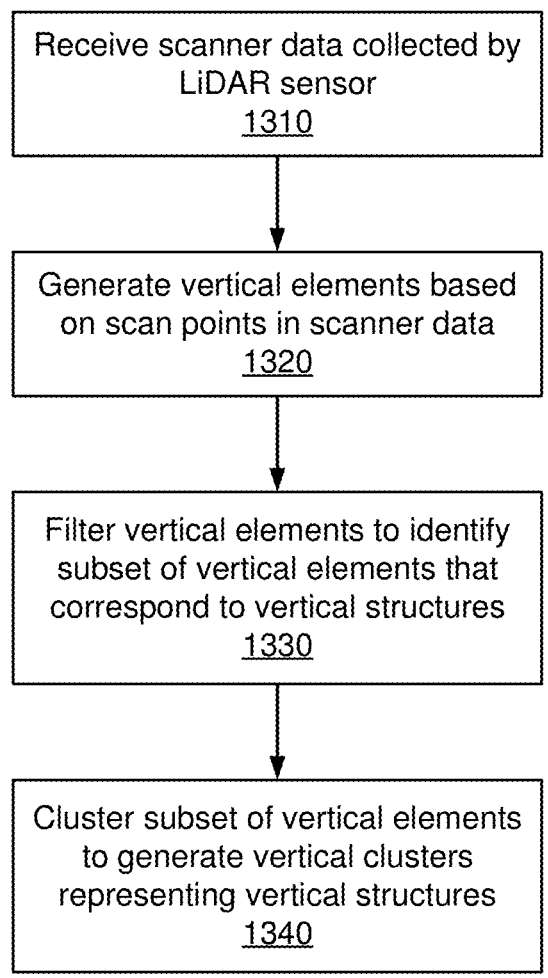
FIG. 13 is a flow chart illustrating a process for detecting vertical structures based on scanner data, according to an embodiment.

FIG. 13 is a flow chart illustrating a process 1300 for detecting vertical structures based on scanner data, according to an embodiment. In one embodiment, the process 1300 is performed by the perception module 210 of the vehicle computing system 120. In other embodiments, some or all of the steps in the process 1300 may be performed by a different module of the vehicle computing system 120 or by a different device in the HD map system. Furthermore, in various other embodiments, the process 1300 may include additional, fewer, or different steps, and the steps shown in FIG. 13 may be performed in a different order. FIGS. 14A-14D illustrate examples of various stages of the process 1300 shown in FIG. 13. For ease of description, the process 1300 shown in FIG. 13 will be described below in conjunction with the examples shown in FIGS. 14A-14D.

The process 1300 begins when the vehicle computing system 120 receives 1310 scanner data collected by the LiDAR sensor. Scanner data includes a plurality of scan lines, and each scan line includes a plurality of scan points. Each scan point specifies a range (for the surface imaged by the LiDAR sensor at a position (e.g., a yaw angle)) along the scan line. A more detailed description of how the LiDAR sensor emits laser pulses at different pitch and yaw angles to collect the scanner data is provided above with respect to step 910 of FIG. 9.

Figure 14A:
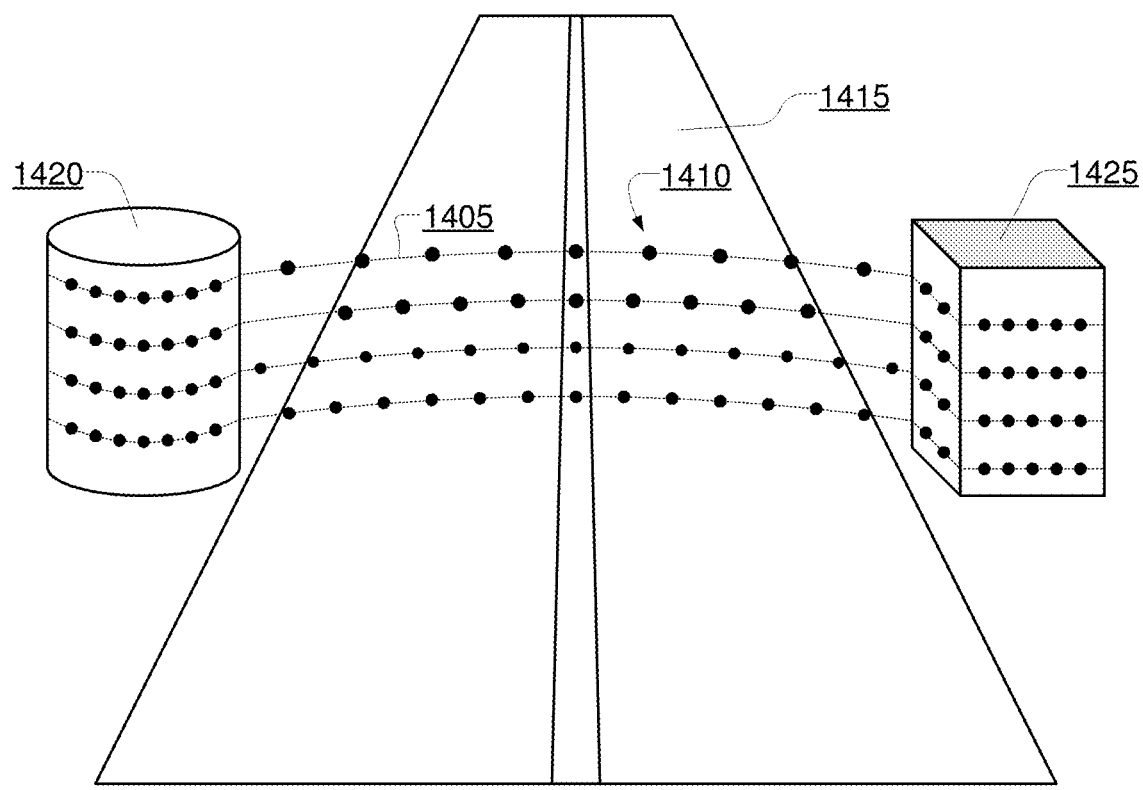
FIGS. 14A-14D illustrate examples of various stages of a process detecting vertical structures based on scanner data, according to an embodiment.

An example of scanner data is shown in FIG. 14A. As described above, the scanner data shown in FIG. 14A includes a plurality of scan lines 1405 and a plurality of scan points 1410. For ease of illustration, a relatively small number of scan lines 1405 and scan points 1410 are shown in FIG. 14A. In other implementations, the scanner data may include many more scan lines and scan points (e.g., hundreds of millions of scan points). The example shown in FIG. 14A depicts scanner data that may be received from a LiDAR sensor mounted on a vehicle as the vehicle travels forward on a road. For instance, the trapezoidal area 1415 represents a perspective view of the road surface in front of the vehicle, and the cylindrical and rectangular objects 1420 and 1425 represent vertical structures along the side of the road, such as a portion of a telephone pole and a mailbox, respectively.

After receiving 1310 the scanner data, the vehicle computing system 120 can optionally preprocess each scan line to remove scan points likely to represent noise. In one embodiment, the preprocessing is performed by dividing each scan line into a plurality of segments. Each segment includes a plurality of adjacent scan points that have similar ranges (e.g., ranges that do not deviate from each other by more than a threshold distance or percentage). After dividing a scan line into segments in this manner, the vehicle computing system 120 removes segments that are shorter than a threshold length. The threshold length can be defined as a number of scan points in the segment (e.g., segments including fewer than three scan points are removed) or a real-world length represented by the scan points in the segment (e.g., segments representing a real-world length of less than ten centimeters are removed).

Figure 14B:
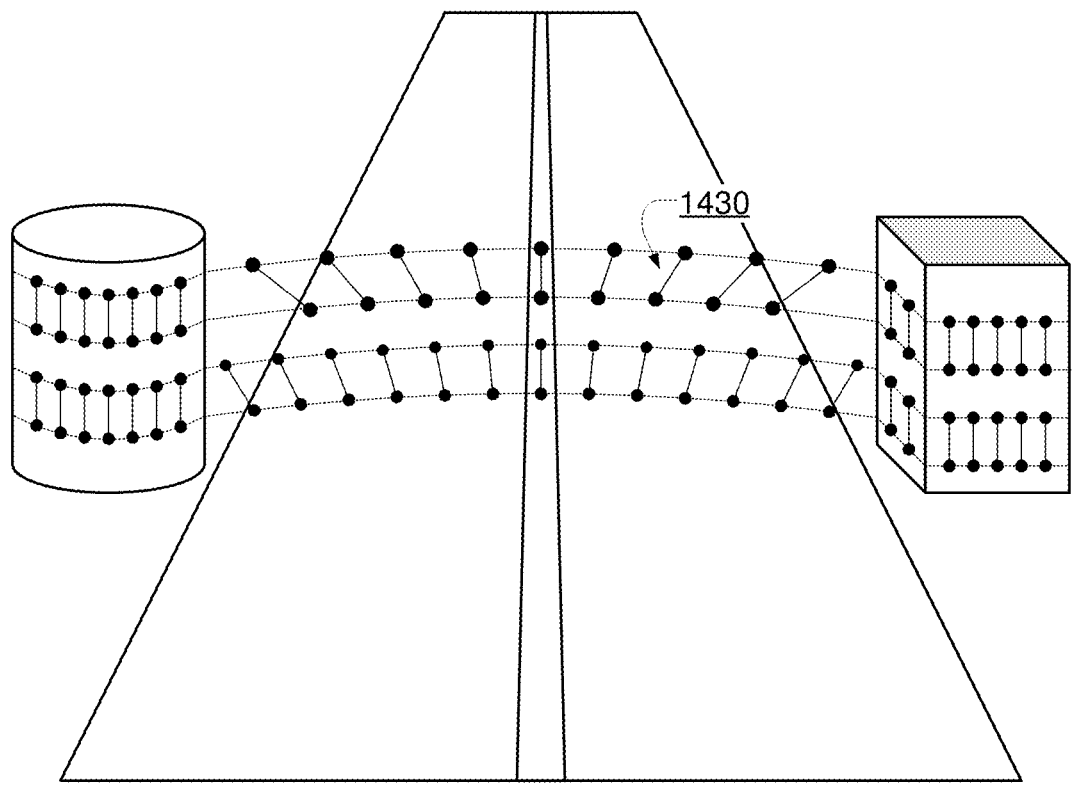

The vehicle computing system 120 generates 1320 vertical elements based on the scan points in the scanner data. Continuing with the previous example, FIG. 14B illustrates vertical elements 1430 that were generated 1320 based on the scan points 1410 shown in FIG. 14A. As referred to herein, a vertical element is a pair of scan points in the scanner data. More specifically, the pair of scan points in a vertical element are captured at the same position (i.e., the same yaw angle) along adjacent scan lines. A vertical element 1430 can also be used to define a line segment between the pair of scan points, and as noted in further detail below, the line segment can be used during the filtering step 1330 to remove certain vertical elements.

The vehicle computing system 120 filters 1330 the vertical elements to identify a subset of vertical elements that represent portions of vertical structures. The vehicle computing system 120 can identify vertical elements that represent a portion of any vertical structure within the detection range of the LiDAR scanner (i.e., the maximum distance that the LiDAR scanner is capable of detecting). For example, the vehicle computing system 120 can identify vertical elements that represent vertical structures near the vehicle, such as telephone poles and mailboxes on the side of the road, and the system 120 can also identify vertical elements that represent vertical structures that are farther away from the vehicle, such as a large building one block away from the vehicle.

The filtering step 1330 removes any vertical elements that deviate too much from the vertical direction. In one embodiment, the vehicle computing system removes such vertical elements by calculating, for each vertical element, an angle between the line segment formed by the vertical element and the vertical direction. If the angle for a vertical element exceeds a threshold angle (e.g., five degrees), then the vertical element is presumed to deviate too much from the vertical direction and is removed. Conversely, if the angle for a vertical element does not exceed the threshold angle, then the vertical element is included as part of the subset of vertical elements.

Figure 14C:
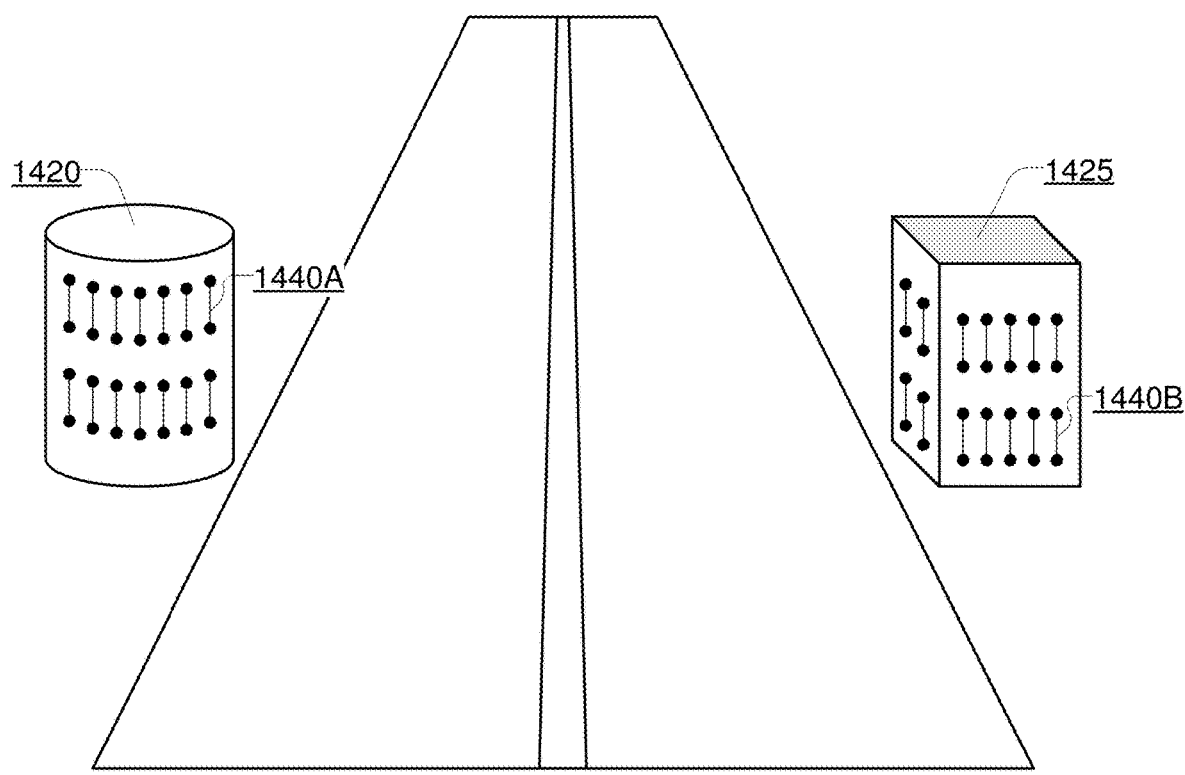

FIG. 14C illustrates an example of the subset of vertical elements that are preserved after the filtering step 1330 is performed on the vertical elements 1430 shown in FIG. 14B. As shown in FIG. 14C, the vertical elements corresponding to the road surface are removed, whereas the vertical elements 1440A corresponding to the cylindrical object 1420 and the vertical elements 1440B corresponding to the rectangular object 1425 are part of the subset of vertical elements that are preserved.

The vehicle computing system 120 clusters 1340 the subset of vertical elements to generate vertical clusters that represent each of the vertical structures. In some embodiments, the vehicle computing system 120 determines whether to join two adjacent vertical elements into the same cluster based on two clustering criteria. First, the vehicle computing system 120 computes an overall range value for each of the two vertical elements (e.g., by computing the average of the ranges specified by each of the two scan points), computes the difference between the two overall range values, and compares this difference to a threshold difference. If the difference is less than the threshold, then the two vertical elements are at approximately the same distance from the LiDAR sensor, and the first clustering criterion is satisfied. Second, the vehicle computing system 120 computes an angle between the line segments defined by the two vertical elements and compares the angle to a threshold angle. If the angle is less than the threshold, then the two vertical elements are approximately parallel to each other, and the second clustering criterion is satisfied. In one embodiment, the vehicle computing system 120 joins two adjacent vertical elements if both criteria are satisfied. In another embodiment, vehicle computing system 120 joins two adjacent vertical elements if either one of the criteria are satisfied. In still another embodiment, the vehicle computing system 120 only uses one of the two criteria, or uses some other combination of criteria to determine whether to join two adjacent vertical elements.

Figure 14D:
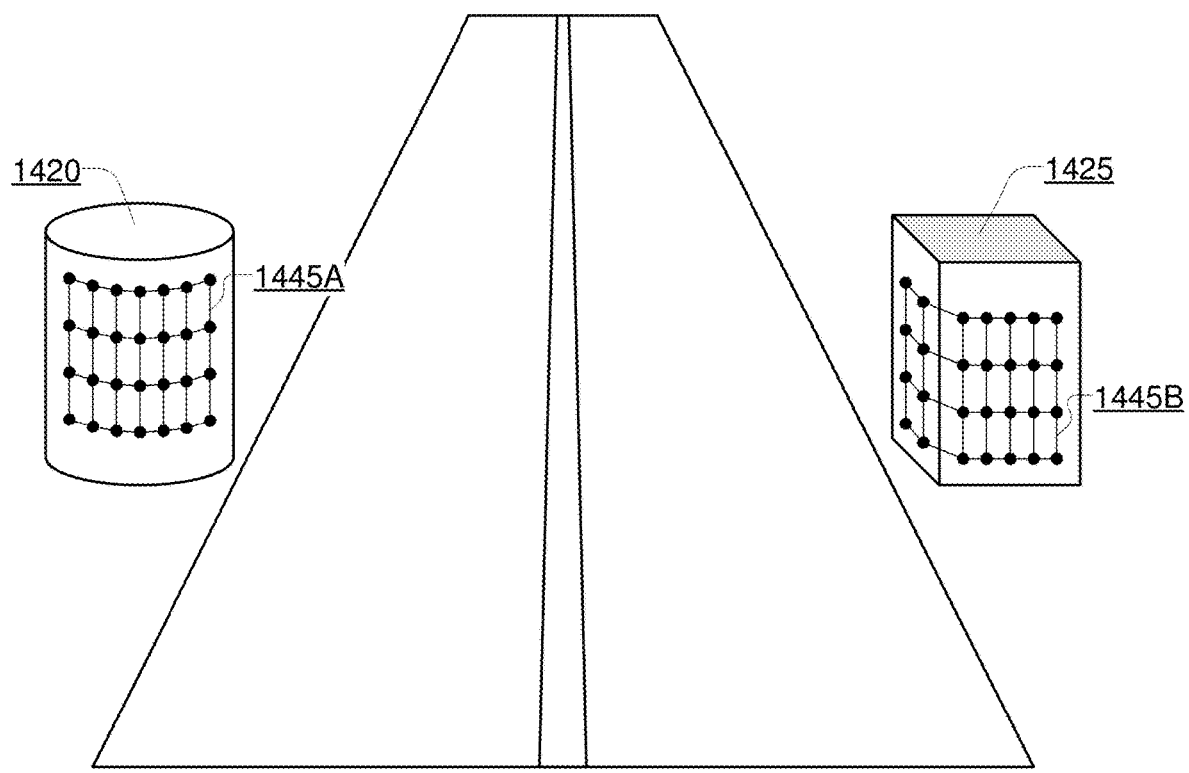

To cluster 1340 the subset of vertical elements, the vehicle computing system 120 evaluates the clustering criteria for each pair of adjacent vertical elements in the subset and determines whether to join each pair of vertical elements based on the clustering criteria. An example of the clusters that are generated from the subset of vertical elements 1440 shown in FIG. 14C is shown in FIG. 14D. In FIG. 14D, the vehicle computing system 120 has clustered the vertical elements 1440A on the surface of the cylindrical object 1420 into a first cluster 1445A and has clustered the vertical elements 1440B on the surface of the rectangular object 1425 into a second cluster 1445B.

After clustering 1340 the subset of vertical elements, the vehicle computing system 120 can optionally remove small clusters (e.g., cluster containing fewer vertical elements than a threshold number of vertical elements). This may be advantageous in some implementations because smaller clusters are more likely to represent noise in the scanner data rather than real-world vertical structures.

The vehicle computing system 120 can also enrich each cluster by generating additional points representing the surface of one or more vertical structures by interpolating additional points on the corresponding vertical clusters. In one embodiment, the vehicle computing system 120 interpolates points along the line segments in the vertical cluster. For example, the vehicle computing system 120 interpolates each point by randomly selecting a vertical element within the vertical cluster and using an interpolation formula to generate an interpolated point at a random position along the line segment between the two scan points in the vertical element. In another embodiment, the vehicle computing system 120 performs a mesh fitting algorithm to fit a mesh to the scan points in a vertical cluster and interpolates points on the mesh (e.g., by randomly selecting positions on the mesh).

The vehicle computing system 120 can use the vertical clusters for a variety of different applications. In one embodiment, the vertical clusters are used to compute the vehicle's change in position and heading since a previous LiDAR scan. For example, the vehicle computing system 120 computes a position of the vertical cluster relative to the vehicle (e.g., by computing a vector between the position of the LiDAR scanner and the centroid of the vertical cluster). The vehicle computing system 120 can then determine a change in position and heading of the vehicle by comparing the computed relative position to a relative position that was computed for the same vertical cluster based on scanner data from a previous LiDAR scan. Because vertical structures such as telephone poles and mailbox are stationary, the change in the corresponding vertical cluster's relative position provides a reliable estimate of the vehicle's change in position and heading. In other embodiments, the vertical clusters are additionally or alternatively used for other purposes. For example, the vehicle computing system 120 may use the clusters to perform collision avoidance, or send the clusters to the online HD map system 110 to be added to the data in an occupancy map 530.

Computing Machine Architecture

Figure 15:
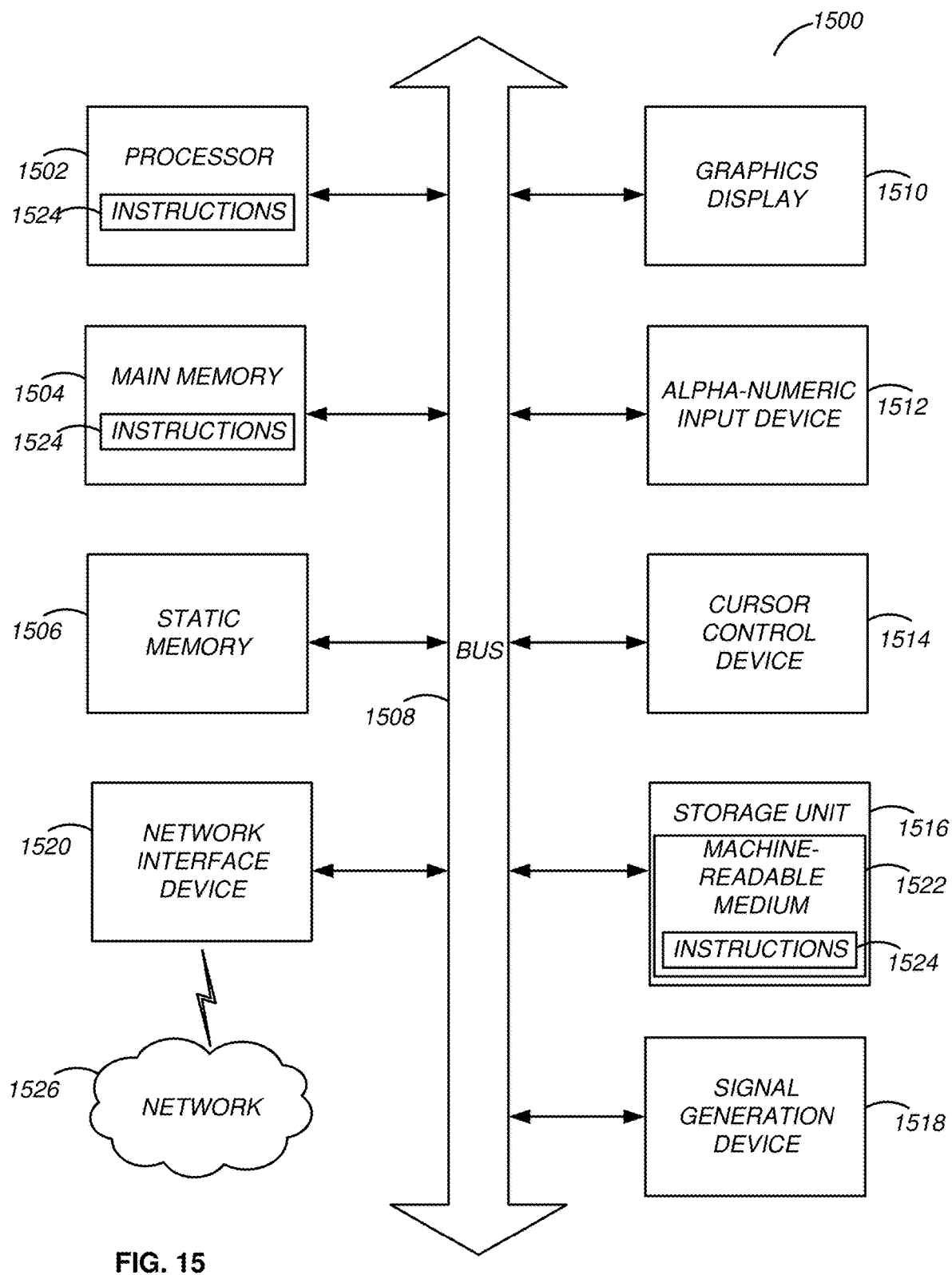
FIG. 15 illustrates an embodiment of a computing machine that can read instructions from a machine-readable medium and execute the instructions in a processor or controller.

FIG. 15 is a block diagram illustrating components of an example machine able to read instructions from a machine-readable medium and execute them in a processor (or controller). Specifically, FIG. 15 shows a diagrammatic representation of a machine in the example form of a computer system 1500 within which instructions 1524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes a processor 1502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1504, and a static memory 1506, which are configured to communicate with each other via a bus 1508. The computer system 1500 may further include graphics display unit 1510 (e.g., a plasma display panel (PDP), a liquid crystal display (LCD), a projector, or a cathode ray tube (CRT)). The computer system 1500 may also include alphanumeric input device 1512 (e.g., a keyboard), a cursor control device 1514 (e.g., a mouse, a trackball, a joystick, a motion sensor, or other pointing instrument), a storage unit 1516, a signal generation device 1518 (e.g., a speaker), and a network interface device 1520, which also are configured to communicate via the bus 1508.

The storage unit 1516 includes a machine-readable medium 1522 on which are stored instructions 1524 (e.g., software) embodying any one or more of the methodologies or functions described herein. The instructions 1524 (e.g., software) may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 (e.g., software) may be transmitted or received over a network 1526 via the network interface device 1520.

While machine-readable medium 1522 is shown in an example embodiment to be a single medium, the term "machine-readable medium" should be taken to include a single medium or multiple media (e.g., a centralized or distributed database, or associated caches and servers) able to store instructions (e.g., instructions 1524). The term "machine-readable medium" shall also be taken to include any medium that is capable of storing instructions (e.g., instructions 1524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method comprising:
   receiving scanner data collected as part of a scan by a light detection and ranging (LiDAR) sensor mounted on an autonomous vehicle, the scanner data comprising a plurality of scan lines, each scan line comprising a plurality of scan points, each scan point specifying a range for a surface imaged by the LiDAR sensor at a position along the scan line;
   generating a plurality of vertical elements, each of the vertical elements comprising a first scan point and a second scan point, the first scan point and the second scan point at the same position along adjacent scan lines;
   filtering the plurality of vertical elements to identify a subset of vertical elements, each of the vertical elements in the subset representing a portion of a vertical structure;
   clustering the subset of vertical elements to yield a plurality of vertical clusters, each of the vertical clusters comprising one or more vertical elements in the subset of vertical elements and representing a vertical structure;
   providing the plurality of vertical clusters for inclusion in a high definition map, the high definition map for use in driving by one or more vehicles; and
   filtering the plurality of vertical clusters to remove vertical clusters comprising fewer vertical elements than a threshold number of vertical elements.

2. The method of claim 1, further comprising:
   dividing each scan line into a plurality of segments, each of the segments comprising one or more scan points in adjacent positions on the same scan line and differing in range from each other by less than a threshold difference; and
   removing segments comprising fewer scan points than a threshold number of scan points.

3. The method of claim 1, further comprising:
   for at least one vertical structure, determining a position of the vertical structure relative to the autonomous vehicle.

4. The method of claim 3, further comprising:
   determining a change in direction and a change in position of the autonomous vehicle based on a comparison between the position of the vertical structure and a previous position of the same vertical structure, the previous position determined based on scanner data collected as part of a previous LiDAR scan.

5. The method of claim 1, wherein filtering the plurality of vertical elements comprises:
   for each of the vertical elements, calculating an angle between an up direction and a line segment between the first scan point and the second scan point of the vertical element; and
   removing vertical elements having an angle exceeding a threshold angle.

6. The method of claim 1, wherein clustering the subset of vertical elements comprises:
   for at least one pair of adjacent vertical elements comprising a first vertical element and a second vertical element, computing a range difference representing a difference between a range of the first vertical element and a range of the second vertical element, and computing an angle between a line segment formed by the first vertical element and a line segment formed by the second vertical element; and
   joining a pair of adjacent vertical elements responsive to determining that the range difference is less than a threshold range difference and that the angle is less than a threshold angle.

7. The method of claim 1, further comprising:
   for at least one of the vertical clusters, generating a plurality of interpolated points based on the vertical elements in the vertical cluster, the interpolated points representing points on an exterior surface of the vertical structure represented by the vertical cluster.

8. The method of claim 7, wherein generating the plurality of interpolated points comprises interpolating points on line segments formed by the vertical elements in the vertical cluster.

9. The method of claim 7, wherein generating the plurality of interpolated points comprises:
   fitting a surface to a mesh formed by the vertical elements in the vertical cluster; and
   interpolating points on the fitted surface.

10. A non-transitory computer-readable storage medium comprising executable computer instructions that, when executed by a processor, cause the processor to perform steps comprising:
    receiving scanner data collected as part of a scan by a light detection and ranging (LiDAR) sensor mounted on an autonomous vehicle, the scanner data comprising a plurality of scan lines, each scan line comprising a plurality of scan points, each scan point specifying a range for a surface imaged by the LiDAR sensor at a position along the scan line;
    generating a plurality of vertical elements, each of the vertical elements comprising a first scan point and a second scan point, the first scan point and the second scan point at the same position along adjacent scan lines;
    filtering the plurality of vertical elements to identify a subset of vertical elements, each of the vertical elements in the subset representing a portion of a vertical structure;
    clustering the subset of vertical elements to yield a plurality of vertical clusters, each of the vertical clusters comprising one or more vertical elements in the subset of vertical elements and representing a vertical structure;
    providing the plurality of vertical clusters for inclusion in a high definition map, the high definition map for use in driving by one or more vehicles; and
    filtering the plurality of vertical clusters to remove vertical clusters comprising fewer vertical elements than a threshold number of vertical elements.

11. The non-transitory computer-readable storage medium of claim 10, the steps further comprising:
    dividing each scan line into a plurality of segments, each of the segments comprising one or more scan points in adjacent positions on the same scan line and differing in range from each other by less than a threshold difference; and removing segments comprising fewer scan points than a threshold number of scan points.

12. The non-transitory computer-readable storage medium of claim 10, the steps further comprising:
for at least one vertical structure, determining a position of the vertical structure relative to the autonomous vehicle.

13. The non-transitory computer-readable storage medium of claim 12, the steps further comprising:
determining a change in heading and a change in position of the autonomous vehicle based on a comparison between the position of the vertical structure and a previous position of the same vertical structure, the previous position determined based on scanner data collected as part of a previous LiDAR scan.

14. The non-transitory computer-readable storage medium of claim 10, wherein filtering the plurality of vertical elements comprises:
for each of the vertical elements, calculating an angle between an up direction and a line segment between the first scan point and the second scan point of the vertical element; and
removing vertical elements having an angle exceeding a threshold angle.

15. The non-transitory computer-readable storage medium of claim 10, wherein clustering the subset of vertical elements comprises:
for at least one pair of adjacent vertical elements comprising a first vertical element and a second vertical element, computing a range difference representing a difference between a range of the first vertical element and a range of the second vertical element, and computing an angle between a line segment formed by the first vertical element and a line segment formed by the second vertical element; and
joining a pair of adjacent vertical elements responsive to determining that the range difference is less than a threshold range difference and that the angle is less than a threshold angle.

16. The non-transitory computer-readable storage medium of claim 10, the steps further comprising:
for at least one of the vertical clusters, generating a plurality of interpolated points based on the vertical elements in the vertical cluster, the interpolated points representing points on an exterior surface of the vertical structure represented by the vertical cluster.

17. A computing system comprising:
a processor; and
a non-transitory computer-readable storage medium comprising executable computer instructions that, when executed by the processor, cause the processor to perform steps comprising:
receiving scanner data collected as part of a scan by a light detection and ranging (LiDAR) sensor mounted on an autonomous vehicle, the scanner data comprising a plurality of scan lines, each scan line comprising a plurality of scan points, each scan point specifying a range for a surface imaged by the LiDAR sensor at a position along the scan line;
generating a plurality of vertical elements, each of the vertical elements comprising a first scan point and a second scan point, the first scan point and the second scan point at the same position along adjacent scan lines;
filtering the plurality of vertical elements to identify a subset of vertical elements, each of the vertical elements in the subset representing a portion of a vertical structure;
clustering the subset of vertical elements to yield a plurality of vertical clusters, each of the vertical clusters comprising one or more vertical elements in the subset of vertical elements and representing a vertical structure;
providing the plurality of vertical clusters for inclusion in a high definition map, the high definition map for use in driving by one or more vehicles; and
filtering the plurality of vertical clusters to remove vertical clusters comprising fewer vertical elements than a threshold number of vertical elements.

18. The computing system of claim 17, the steps further comprising:
dividing each scan line into a plurality of segments, each of the segments comprising one or more scan points in adjacent positions on the same scan line and differing in range from each other by less than a threshold difference; and
removing segments comprising fewer scan points than a threshold number of scan points.

* * * * *